Jan. 1, 1929.

R. P. LANSING 1,697,247

SHOCK ABSORBER FOR VEHICLES

Original Filed Oct. 16, 1924

INVENTOR
Raymond P. Lansing
BY
Dempster M. Smith
ATTORNEY

Patented Jan. 1, 1929.

1,697,247

UNITED STATES PATENT OFFICE.

RAYMOND P. LANSING, OF MONTCLAIR, NEW JERSEY.

SHOCK ABSORBER FOR VEHICLES.

Application filed October 16, 1924, Serial No. 743,924. Renewed March 28, 1928.

My invention relates to shock absorbers, or appliances for controlling the action of vehicle springs.

The general object of the invention is to provide an appliance of the friction type which is strong, durable and of simple construction, and therefore may be produced at a moderate cost.

A more particular object is to provide an appliance which includes relatively revoluble structures, a relatively large number of friction elements or surfaces operative between these structures in order to give a very substantial friction effect with a relatively moderate pressure applied to the surfaces, yieldable means or a spring, and inclined elements or screw threads co-operating with the yieldable means to produce or control the friction pressure, which preferably differs in the different directions of relative movement of the revoluble structures.

A further object is to provide an appliance including some or all of the above mentioned features and in which a single yieldable element or spring provides all necessary friction pressure, in connection with a suitable plurality of friction members or discs.

A further object is to provide a friction shock absorber including a tight enclosure which effectively retains an oil or grease serving as a lubricant and a noise reducing or preventing medium, and also excludes dirt and water; and preferably the appliance is so designed that there is only a single external or exposed joint or surface of moving contact, the moving surfaces at this point being held tightly in engagement to provide an effective grease, dirt and water-proof seal.

As embodied in preferred physical forms, the invention is similar in some respects to the structures disclosed in other applications of Charles Marcus, Harold D. Church and myself, but differs from such structures in important respects, these similarities and differences being sufficiently pointed out hereafter.

The accompanying drawing shows one exemplifying structure embodying the invention. After considering this example, skilled persons will understand that many variations may be made within the principles of the invention and I contemplate the employment of any structures that are properly within the scope of the appended claims.

Figure 1:
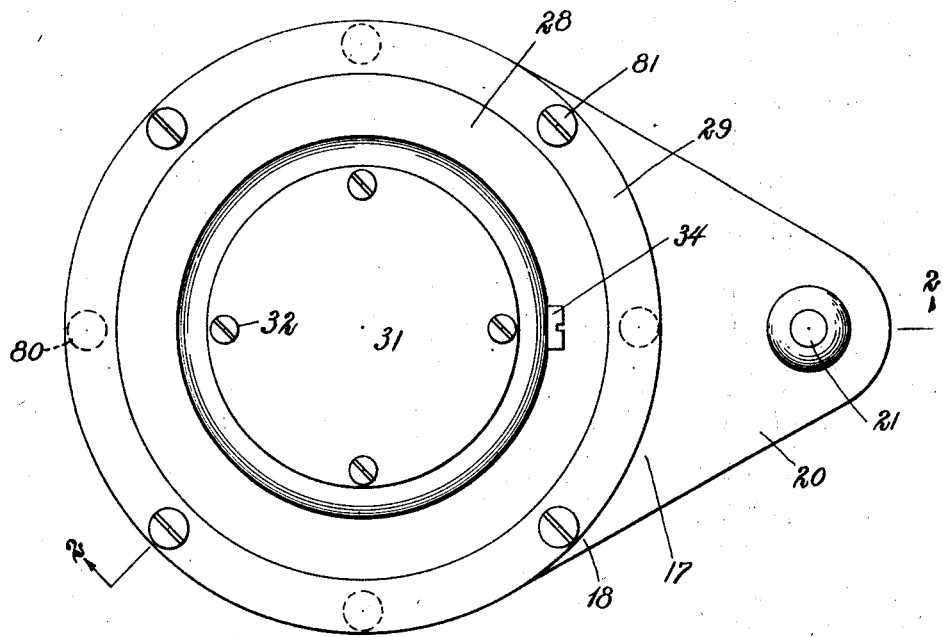
Fig. 1 is a side elevation of a shock absorber or vehicle spring controller embodying the invention in one form.

A main or base plate 1 is arranged for connection in any suitable way to one of two relatively movable, spring-connected parts of a vehicle, such as the frame and axle. While the base plate might be provided with an arm adapted to be pivotally connected to the vehicle part, in the present specific example, the plate is provided with ears 2, and is to be rigidly connected by bolts 3 to the vertical web of the side frame member of a vehicle chassis.

A composite structure designated as a whole by reference numeral 4, is arranged for oscillation in relation to the main or base plate. These two principal parts of the structure may therefore be conveniently designated, especially in some of the claims, as "relatively-revoluble members" or "structures", or the composite structure 4 may be designated as a revoluble or oscillatory structure in distinction from the base plate 1 and its connected parts, which is usually relatively stationary since it is most conveniently rigidly connected to a chassis frame, as stated above.

The base plate is formed with a short sleeve 5, and a spindle 6 projects from this sleeve. Usually the spindle, for manufacturing convenience, is made separately and passes through the sleeve and has a head 7 fitting in a counter-bore 8 of the base plate. Longitudinal corrugations 9 may be provided on the spindle and in the sleeve, to prevent spindle rotation, although there is no considerable force tending to cause the spindle to revolve.

A revoluble structure 4 is preferably made in the form of a tight enclosure or housing and in the present specific example it includes the following parts: An inner member or plate 10 has a central aperture 11 embracing sleeve 5 with a bearing fit. Plate 10 has a flat surface 12 adjacent the sleeve engaging the flat outer face of a flat annular bearing ring 13 located in an annular recess in the outer face of base plate 1. This ring may in some cases be of fibre, but is preferably of a suitable metal such as bronze, to provide a suitable thrust bearing for the surface 12 of plate 10, which is usually of steel. A washer 14 of felt or other suitable compressible material is located in a recess in the outer face of the base plate surrounding ring 13. The outer face of the washer engages the inner surface of plate 10 and excludes dirt and moisture from the thrust bearing surface and also tends to retain any slight amount of grease or other lubricant that may escape by slow leakage between plate 10 and ring 13.

Plate 10 has a shallow cylindrical extension 15 terminating in the flat flange 16. A plate 17 is formed with a hub portion 18 in the form of an annulus, lying against flange 16 with an interposed thin gasket 19. Plate 17 is also formed with an extension or lever arm 20, the end of which is provided with a ball-end fitting 21. By means of a suitable link this fitting is connected to the other relatively movable vehicle member such as the axle. The lever arm may be made of any suitable or usual length. In the present specific example, the arm is much shorter than is usual in shock absorbers of the friction type. With an arm of this approximate length the device is well adapted for use at the front end of a motor vehicle where the axle movement is relatively small. By suitable design or adjustment of the friction elements, yieldable means or spring, etc., a longer lever arm may be provided and practically the same or any reasonable or desirable friction effect may be obtained in connection with such a long arm, and the appliance is then more suitable for use at the rear end of the vehicle where the axle movement is usually greater, but higher friction values have to be provided on account of the greater lever effect of the long arm.

An annulus or flat ring 22 overlies the annular hub portion 18 of the lever arm, with an interposed gasket 23. This ring has an inturned cylindrical flange cut or otherwise arranged to provide spaced lugs 24. A suitable plurality of friction discs 25 are provided, with peripheral teeth or lugs interfitting with lugs 24. The plates thus have the necessary slight axial movement and are connected to revolve with the rotary structure 4, and are therefore conveniently designated in some instances as "rotor-connected plates" or "discs". The disc 25$^a$ which is the innermost of the rotor-connected discs, lies directly against a face of plate 10 and desirably, this disc is thicker than the others so that its peripheral lugs may have positive contact with the ends of lugs 24. This disc 25$^a$ takes the wear, due to frictional contact with the innermost one of the other set of discs referred to just below, so that after long service, if this wear is appreciable, it may be compensated for by renewal of disc 25$^a$. Otherwise, this disc could be omitted and an adjacent surface of plate 10 would then co-operate with the innermost one of the other set of discs.

An outer housing member 28, which may conveniently be of pressed sheeet metal, has a peripheral flange 29 over-lying ring 22, with an interposed gasket 30. Desirably, the outer face of the housing member 28 is apertured and the aperture is covered by a plate 31 removably secured by screws 32. An aperture 33 is provided in the housing member 28 for the supply of oil or other lubricant, and this aperture is closed by a screw plug 34; otherwise any known or suitable lubricating nipple may be inserted in the aperture to provide for the easy connection of any known or suitable grease gun or similar appliance by which the interior of the rotary structure may be filled with oil or grease.

A nut or shifter 40 is arranged for axial movement on spindle 6. The inward end of this shifter has a lug 41 co-operating with lugs 42 on the outer end of sleeve 5, to prevent rotation of the shifter and permit axial movement. The inner portion of the shifter also has a flange 44, the inner face of which at times engages a spacing ring or washer 45 interposed between the flange and plate 10 to limit inward movement of the shifter. In some cases this spacer could be omitted and inward movement of the shifter would then be limited by engagement with the outer ends of sleeve lugs 42; but usually the spacing ring is provided since it may readily be made of definite thickness to provide for proper location of the shifter when in inward position.

On the outer cylindrical face of the shifter are one or more screw threads 46 of fairly "steep" pitch. This pitch is variable within considerable limits, and depends on other factors, such as maximum spring pressure and the desired resultant friction pressure in one direction of movement of arm 20.

A plate 50, which may be conveniently identified as a "pressure plate", is provided with a central aperture having threads 51 engaging threads 46. A moderate but definite clearance, as at 42, is provided between the inner face of plate 50 and the outer face of flange 44 for a purpose described below.

Spaced lugs 55 project inward from plate 50 and a second set of friction discs 60 is provided, having their inner peripheries formed with teeth or lugs fitting between the plate lugs 55, so that the discs are compelled to rotate with the plate but may move moderately in axial directions.

A spring abutment in the form of a washer or nut 65 is adjustably screwed on the outer end portion 66 of spindle 6, which may be of reduced diameter. The spring abutment is secured in adjusted position by a lock nut 67. Yieldable pressure means, represented in this example by a helical spring 70 of flat section and of substantial "strength" or pressure value, is properly compressed between the abutment 65 and plate 50. The inward end of the spring may, in some cases, engage directly with the plate, but in the present specific design a dished washer 75 is provided between the spring and the plate, and so arranged that the spring bears against the flat portion of the washer, while the shallow peripheral flange of the washer engages against the outer face of plate 50, leaving a clearance for longitudinal movement of the nut, this clearance being somewhat greater than the clearance at 42, so that the outer end of the nut will not engage the washer.

The parts of the rotor or housing structure may be secured together in any suitable way. For convenience in assembling and dismounting the device, however, the hub portion 18 of lever 20 is secured to flange 16 of the inner rotor member 10 by screws 80, which have their heads located inwardly; and housing member 28 and ring 22 are secured to the annular hub 18 by screws 81, which have their heads arranged outwardly. In this way the housing member 28 may be easily removed by removing screws 80 to give access to the nut or shifter, plate 50 and the friction discs, without disturbing screws 80 or separating lever arm 20, or its hub 18, from plate 10: and at the same time, if desired, the ring 22 and any or all of the friction discs may be removed for cleaning or replacement.

The detachable cover plate 31 gives convenient access to spring abutment 65 to permit adjustment thereof without dismounting any other parts of the structure.

The appliance may be arranged to provide the greatest resistance to either vehicle spring compression or recoil. It is usually considered advisable to apply the greatest resistance to the recoil movement of the vehicle spring axle, and the appliance will therefore be described as arranged for operation in that manner. The operation when arranged to apply greatest resistance to vehicle spring compression will be easily understood by reading the operative description with suitable changes in words which indicate positions or directions of movement.

The screw threads on the nut or shifter 40 and in plate 50, have a right-hand lead. When the vehicle is running over approximately smooth roads, the slight movement of the axle in relation to the chassis frame, produces a slight oscillating or vibratory movement of the lever arm 20. In this movement there is no, or no substantial resistance to the vehicle spring action. The rotary structure 4 revolves about spindle sleeve 5 carrying with it by the frictional contact of the discs 25 and 60, plate 50, whose screw threads 51 act upon shifter threads 46 and move the shifter longitudinally without any effect upon spring pressure or friction resistance so long as the angle of free movement corresponding to smooth road conditions is within the range represented by the clearance at 42 between the nut flange 44 and the inner face of plate 50. In other words, the nut may move out to and fro a distance represented by this clearance without changing the spring pressure or friction effect of the shock absorber. During arm movement within this range, which may be described as a "free range" or "period" of movement, the only friction effect is that produced at the contacting surfaces of plate 10 and bearing ring 13; but this friction may be considered and is in fact in some cases negligible, since, as previously stated, the ring may be constructed of bronze, which has a very small coefficient of friction when in contact with plate 10 which is usually of steel, and moreover the bearing surfaces are of small average radius. Therefore, while plate 10 is always urged into firm contact with the outer surface of ring 13 by the pressure of spring 70 acting through washer 75, plate 50 and the friction discs, the friction effect at this surface is small or negligible, and the vehicle springs have practically free play on comparatively smooth surfaces.

Figure 2:
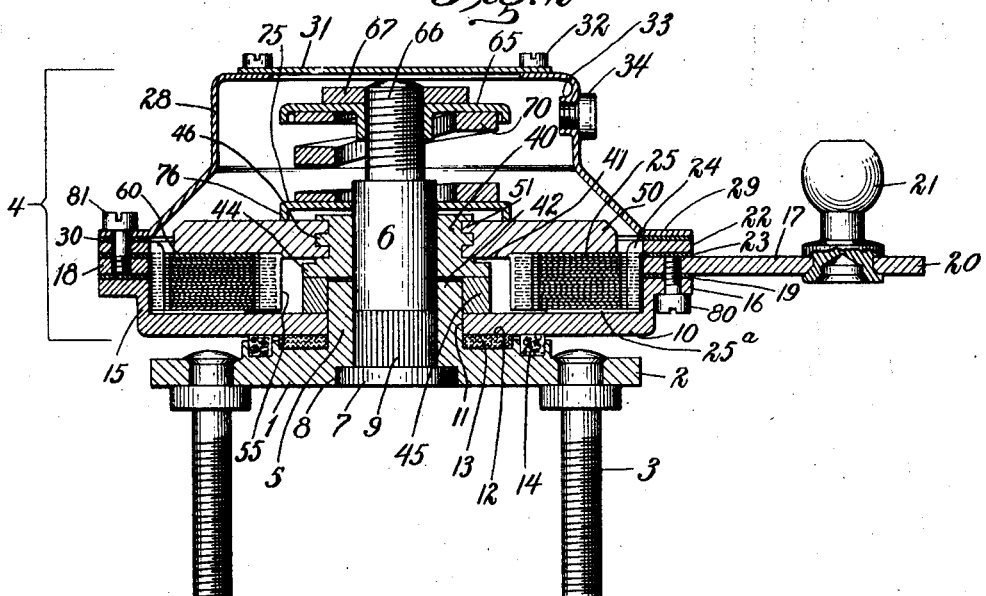
Fig. 2 is a longitudinal, horizontal section.

When the vehicle wheel strikes an obstruction sufficiently high or abrupt to cause the axle to move up considerably in relation to the chassis frame, lever 20 is moved counterclockwise as in Fig. 1, or the ball end 21 moves away from the eye of the observer in Fig. 2. If shifter 40 has previously been in an outward position, it is first moved inward by the action of the screw threads until its flange engages spacer 45. Further movement of arm 20 thereupon, by the frictional contact of the discs 25 and 60, causes plate 50 to rotate slightly further along with the discs and the entire rotary structure, while nut 40 remains stationary by reason of the engagement of lugs 41 with sleeve lugs 42. The reaction of the screw threads causes plate 50 to move slightly outward or in other words, the plate rides up on the screw threads and the spring pressure exerted through the plate upon the friction discs is relieved to a substantial degree, and thereupon slippage commences between the contacting surfaces of all the friction discs of the two sets, this friction representing less than the normal compression value of spring 70, the reduction in pressure being proportional to the aixal movement of plate 50 which takes a substantial part of the spring thrust and conveys the remainder of the spring pressure to the friction discs. The resultant pressure on the friction discs may evidently be varied considerably by properly regulating the pitch of the screw threads and the normal spring pressure. In a particular example, the resultant spring pressure may be such that the frictional resistance to the arm movement as measured in pounds at the ball fitting 21, will be approximately 20% (more or less) of the resistance to arm movement in the other or recoil direction. It will be evident that this resistance, which is built up quickly and practically immediately after passing through the free range at the beginning of the stated axle movement, is maintained to the end of that movement.

In the ensuing recoil movement wherein the axle moves away from the chassis frame, the entire rotary structure 4 including plate 50 and the friction discs at first move together by the friction contact of the discs. The screw thread reaction which tended to move plate 50 outward is first relieved and then plate screw threads 51 act on the shifter threads 45 and move the shifter outward until the clearance at 42 is taken up. During this movement there is practically no friction resistance, and this small angle of free movement at the beginning of the recoil stroke is desirable because it definitely prevents any complete or partial tendency toward a locking action or toward the creation of any considerable or excessive resistance, which would tend to prematurely check the axle at the beginning of recoil. When the clearance 42 is taken up by flange 44 striking the inner face of plate 50, shifter 40 can move no farther outward along the spindle; plate 50 is locked against further rotation in the recoil direction (by reason of the irrevoluble connection of shifter 40 to sleeve 5); slippage therefore commences at all the friction surfaces, the friction resistance so produced being equal to the full pressure value of spring 70; and this condition continues to the end of the recoil movement. With a spring of reasonable dimensions and adjusted for proper pressure value, and with a substantial number of friction discs, a very substantial friction resistance is thus opposed to recoil strokes of arm 20, this resistance being unsually very much greater than the resistance afforded to the vehicle spring compression movements.

The structure described as a physical embodiment of the present invention is similar in important respects, both as to structure and operation, to the structures disclosed in prior applications of Charles Marcus, Ser. No. 600,082, filed November 10, 1922, and Harold D. Church, Ser. No. 619,157, filed February 15, 1923, and Ser. No. 619,158, filed February 15, 1923, of which the last named application to Harold D. Church, Ser. No. 619,158, may be taken as a typical example. In these previous structures the principle of combined spring pressure and inclined surfaces or screw threads acting on a pressure member is employed to produce a definite but moderate friction resistance to movement of the lever arm in one direction and a very much greater resistance to lever movement in the other direction, with a small angle or period of relatively free movement of the lever arm while the vehicle is running on comparatively smooth roads. In the applications just mentioned, however, the pressure member or plate is directly connected by screw threads with a fixed spindle, and the maximum pressure in one direction of arm movement does not depend entirely upon the spring pressure, but upon spring pressure combined with the screw thread action, so that if the screw threads were made of moderate or fine pitch, excessive pressure might be produced, or there might in fact be a locking action in one direction of arm movement. Such an effect is prevented in the earlier application by making the thread pitch angle sufficiently steep to prevent locking or excessive pressure.

In the present invention, as distinguished from the previous applications, the maximum pressure effect is dependent solely upon spring pressure, since when lever arm 20 moves in the direction corresponding to the greatest friction resistance, plate 50 is definitely locked by contact with the shifter flange 44 and the pressure exerted upon the friction discs is then due only to the thrust of spring 70, so that with any reasonable or practicable spring dimensions and number of friction discs any positive locking of lever arm 20 is impossible, regardless of the pitch angle of the screw threads.

The exemplifying structure here shown is also similar in many respects to prior applications of Harold D. Church, Ser. No. 619,159, filed Feb. 15, 1923, and my prior applications, Ser. No. 712,532 and 713,533, filed May 15, 1924, and other of my applications temporarily identified as Cases 7, 8 and 9; and it is especially similar to the structures shown in Case 9. The present structure is in fact, except for minor features practically identical with the structure shown in Fig. 6 of said Case 9, which is included in that application because of its similarity to the other structures there shown, but not particularly claimed in that appliance because it represents a species distinct from the other species disclosed. The present application therefore is, except for minor differences, a division or continuation in part of said application, Case 9, for the purpose of claiming the features of the invention as shown in Fig. 6 of Case 9 and in the present application.

In all of the shock absorber structures shown in the applications just above identified, except Fig. 6 of Case 9, to which further reference will not be made because it is in general practically identical with the present disclosure, two yieldable pressure devices which are specifically springs, are employed, and although it is sufficiently apparent by the disclosures of said applications that in some cases a single spring may be employed, they do not show or describe specifically a structure embodying features common to said prior structures and the present structure, but arranged for satisfactory operation with only one yieldable pressure element or spring. It has been found by study and experiment that where a suitable number of friction surfaces are provided, as for instance, by the employment of two sets of interfitting friction plates or discs, which may be made sufficiently thin so that a large number of plates may be arranged in a small space, sufficient friction resistance can be provided with quite moderate spring pressure, and in fact a single spring of moderate dimensions and pressure value may be employed, as here disclosed.

The housing of the rotary structure 4 is usually partly or entirely filled with a suitable liquid medium such as a heavy oil or grease. Such liquids, or semi-liquids, of course, act as lubricants, and in the structure shown, in which there is no definite partition in the rotary structure, the lubricant has access to all the parts including the friction discs, and the design is such that a sufficient number of discs may be provided to give the desired friction value with lubricated surfaces. Lubrication of all the parts materially reduces wear, especially on disc surfaces and the screw threads. When lubrication only is in view a smaller amount of lubricant may be provided; but a liquid medium such as a lubricant also has an important noise-preventing or reducing effect, and for that purpose a relatively large amount of the liquid or semi-liquid medium is introduced into the casing, sufficient to approximately fill it, or at least to come up to the level of the shifter or considerably above the upper edge of the shifter when the appliance is arranged with the spindle horizontal, as in Fig. 1. From this point of view the liquid agent in the casing is to be considered as a noise-reducing or preventing medium, without necessary regard to its lubricating qualities, and in fact the liquid need not have any substantial lubricating value. When a liquid or approximately-liquid medium is provided in the manner and for the purpose described, it has access to both ends of the nut or shifter 40, and acts as a yieldable cushioning medium between the ends of the nut and washer 75 and spacer 45 and the end of sleeve 5 and the sleeve lugs 42, and materially reduces or entirely prevents any noise which would otherwise be caused by the contact of the shifter with other parts as it moves axially to and fro. In the absence of any lubricant or noise preventing medium this axle movement of the shifter with abrupt contact with other parts at either end of its stroke, causes considerable noise or rattle, which is objectionable in some cases.

I claim:

1. A vehicle spring controlling appliance comprising relatively revoluble structures, friction elements intermediate the structures, a single spring for producing friction pressure, a revoluble pressure member intermediate the spring and the friction elements, and controlling means acting to lock the pressure member against rotation in one direction of movement, whereupon the normal pressure of the spring is applied to the friction elements, and also acting to free the pressure member for rotation in the other direction and at the same time to urge the pressure member to resist the spring pressure and reduce the effective pressure on the friction elements.

2. A vehicle spring controlling appliance comprising relatively revoluble structures, friction means for resisting relative movement of the structures by sliding contact under pressure, a single pressure producing spring, and pressure controlling means including a revoluble pressure member intermediate the spring and the friction means and a shifter arranged for axial movement, held against rotation and having diagonal elements co-operating with the pressure member to lock it in one direction of movement and to urge it against the spring pressure to reduce the frictional effect in the other direction of movement.

3. A vehicle spring controlling appliance comprising relatively revoluble structures, a plurality of friction discs intermediate the structures, a single spring for producing friction pressure, a revoluble pressure plate intermediate the spring and the friction elements, and an irrevoluble shifter having screw-connection with the pressure plate and acting to lock the plate against rotation in one direction of movement, whereupon the normal pressure of the spring is applied through the plate to the discs, and also acting to free the pressure plate for rotation in the other direction and at the same time to urge the plate to resist the spring pressure and reduce the effective pressure on the friction discs.

4. A vehicle spring controlling appliance comprising a base plate adapted for connection to a vehicle frame member, a revoluble structure mounted for rotation in respect to the base plate, a set of friction discs connected to revolve with the revoluble structure, a shifter, a pressure member having screw thread connection with the shifter, a set of friction discs connected to rotate with the pressure member and interfitting with the discs of the set first mentioned, and a single pressure spring acting on the pressure member.

5. A vehicle spring controlling appliance comprising a base plate adapted for connection to a vehicle frame member, a revoluble structure mounted for rotation in respect to the base plate, a set of friction discs connected to revolve with the revoluble structure, a shifter, a pressure member having screw thread connection with the shifter, the shifter having a locking member co-operating with the pressure member and having a substantial normal clearance therefrom.

6. A vehicle spring controlling appliance comprising a base plate adapted for connection to a vehicle frame member, a revoluble structure mounted for rotation in respect to the base plate, a set of friction discs connected to revolve with the revoluble structure, a shifter, a pressure member having screw thread connection with the shifter, a set of friction discs connected to rotate with the pressure member and interfitting with the discs of the set first mentioned, and a single pressure spring acting between the pressure member and an abutment secured to the base plate.

7. A vehicle spring controlling appliance comprising a base plate, a spindle extending therefrom, a revoluble structure mounted to rotate about the spindle, a rotatable pressure member, two sets of interfitting friction elements, those of one set being connected to the revoluble structure and those of the other set being connected to the pressure member, a single pressure-producing spring acting on the pressure member, and a nut arranged for axial movement on the spindle and restrained from rotation, the nut and pressure member having interfitting screw threads.

8. A vehicle spring controlling appliance comprising a base plate, a spindle extending therefrom, a revoluble structure mounted to rotate about the spindle, a rotatable pressure member, two sets of interfitting friction elements, those of one set being connected to the revoluble structure and those of the other set being connected to the pressure member, a single pressure-producing spring acting on the pressure member, and a nut arranged for axial movement on the spindle and restrained from rotation, the nut and pressure member having interfitting screw threads, the nut also having means co-operating with the pressure member to lock the latter against rotation in one direction after limited free travel of the nut.

9. A vehicle spring controlling appliance comprising a base plate having a spindle extending centrally therefrom and a thrust bearing surface surrounding the spindle, a shifter mounted for axial movement about the spindle and restrained from rotation by engagement with the base plate, a revoluble structure constructed and arranged substantially as an oil tight housing having an inner member revolubly mounted about the spindle, said member having a surface in contact with the thrust bearing surface of the base plate, a spacer intermediate said member and the shifter, a pressure plate having screw thread engagement with the shifter, the shifter having a flange confronting the pressure plate with a substantial normal clearance, a single pressure spring acting between the abutment on the spindle and the pressure plate, and two sets of interfitting friction discs, those of one set being connected to rotate with a revoluble structure, and those of the other set being connected to rotate with the pressure plate.

10. A vehicle spring controlling appliance comprising a base plate having a spindle extending centrally therefrom and a thrust bearing surface surrounding the spindle, a shifter mounted for axle movement about the spindle and restrained from rotation by engagement with the base plate, a revoluble structure constructed and arranged substantially as an oil tight housing having an inner member revolubly mounted about the spindle, said member having a surface in contact with the thrust bearing surface of the base plate, a spacer intermediate said member and the shifter, a pressure plate having screw thread engagement with the shifter, the shifter having a flange confronting the pressure plate with a substantial normal clearance, a single pressure spring acting between the abutment on the spindle and the pressure plate, and two sets of interfitting friction discs, those of one set being connected to rotate with a revoluble structure, and those of the other set being connected to rotate with the pressure plate, the revoluble structure also comprising an outer demountable housing portion having an outer aperture closed by a detachable cover plate.

Signed at Hoboken, in the county of Hudson and State of New Jersey, this eleventh day of October, A. D. 1924.

RAYMOND P. LANSING.